Sept. 3, 1935. C. W. VOGT 2,013,018
METHOD AND APPARATUS FOR PROCESSING MATERIAL
Filed Jan. 11, 1935
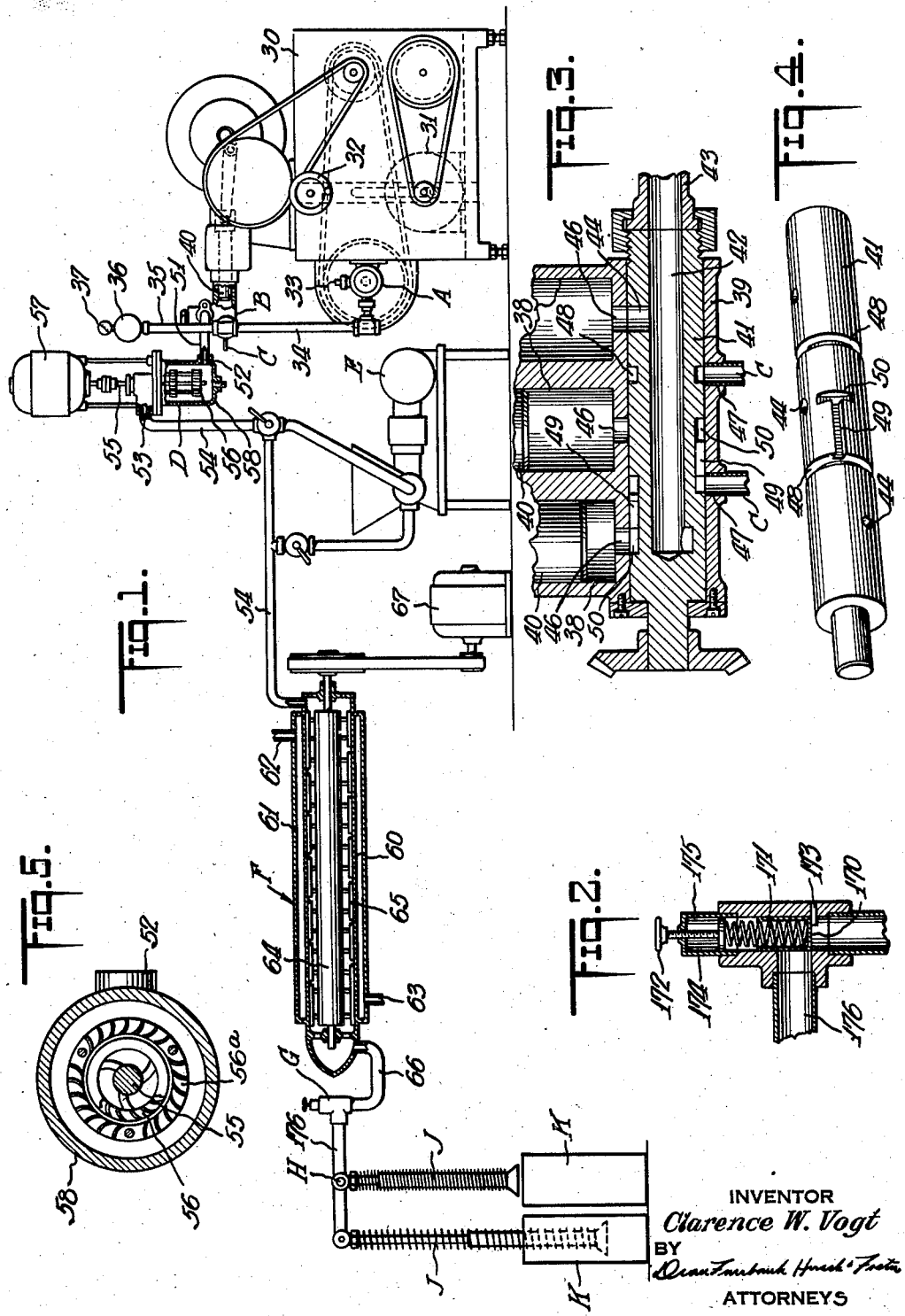
INVENTOR
Clarence W. Vogt
BY
ATTORNEYS Patented Sept. 3, 1935

2,013,018

UNITED STATES PATENT OFFICE 2,013,018

METHOD AND APPARATUS FOR PROCESSING MATERIAL

Clarence W. Vogt, Greenwich, Conn., assignor to Vogt Processes, Incorporated, Louisville, Ky., a corporation of Delaware Application January 11, 1935, Serial No. 1,314

14 Claims. (Cl. 62—114)

This invention relates to methods and apparatus for processing liquids and semi-liquid materials or mixtures wherein the heat content of the materials or mixtures is to be decreased during the treatment and while the treated material is caused to move through a confined path.

The invention is particularly adapted for use in the freezing of ice cream, sherbet or other frozen confections which require the incorporation of air or other gas and may be used for the freezing or chilling of lard or lard substitutes, margarin and analogous products, if a gas is to be incorporated.

In the manufacture of ice cream, which requires the incorporation of sufficient gas to give an 80% to 120% overrun, the liquid mix employed will not retain any very considerable amount of air at atmospheric pressure and prior to partial freezing. The usual practice with batch freezers is to partially fill the freezer with the mix, and to rely upon the whipping and agitation after a portion of the water content has been frozen, to fold or whip the desired amount of air into the partially frozen material. By such practice however, the amount of air incorporated cannot be definitely regulated and the first portion of the batch flowing from the freezer will have an overrun different from succeeding portions of the batch.

In the type of continuous freezer disclosed in my prior Patents Nos. 1,783,864, 1,783,865, 1,783,-866, and 1,783,867, issued December 2, 1930, a continuous delivery of the partially frozen ice cream with a readily controlled and uniform overrun is secured, but the gas and liquid are delivered to the freezing chamber, and incorporation of the gas in the product is accomplished by the whipping, stirring or other mechanical agitation during the freezing operation.

A feature of the present invention is to still more accurately control the overrun by thoroughly mixing or stirring the liquid and gas under pressure prior to their admission to the freezing chamber, whereby the gas or at least a very substantial portion thereof, is dissolved in the liquid. The relative volumes of liquid and gas delivered to the apparatus may be controlled at will. This liquid with the gas dissolved therein is caused to flow into and out of contact with the temperature changing surface, to effect freezing, and the desired overrun is secured independently of the mechanical whipping, stirring, beating or other agitation within the temperature changing unit.

During the freezing and upon the release of the pressure on the partially frozen material after the freezing operation is completed, at least a portion of the dissolved gas comes out of solution and is imprisoned in the mass of ice crystals, butter fat, serum solids and/or other ingredients. The pressure decreases due to increasing congelation during the progress of material through the freezing unit. Upon the final release of pressure, the material expands to produce a smooth, palatable product with the desired and accurately controlled overrun.

A further object of the invention is to provide a simple and effective means whereby relatively solid particles or bodies, such as fruit, nuts, etc., may optionally be injected into the mixture of liquid or semi-liquid material which has previously had the gas dissolved therein.

As a further feature of the invention the liquid or semi-liquid material with the dissolved gases, is maintained under a pressure substantially higher than that required to cause advance of the material, until the material has been cooled, chilled or frozen to a sufficiently stiff state so that upon release of the pressure the gas coming out of the solution, due to the drop in pressure, cannot accumulate in the form of objectionably large cells or bubbles. The relative minute gas bubbles coming out of solution are imprisoned and held by the stiffened, partially congealed material.

The present application is a continuation in part of my copending application Serial No. 602,157, filed March 31, 1932 and while I have diagrammatically illustrated herein the use of a freezer corresponding to the general type of freezer disclosed in my earlier patents, above identified, it will be understood that freezers constructed in accordance with application Serial No. 602,157 or other types of freezing units may be employed, if desired.

In the accompanying drawing there is illustrated one embodiment of my invention with certain types of apparatus, the details of which except as hereinafter pointed out, may be varied within wide limits. In the drawing:

Fig. 1 is a view partly in side elevation and partly in section, of one combination of apparatus which may be employed, Fig. 2 is a sectional detail of a pressure hold back control for the outlet, Fig. 3 is a sectional detail of the pump which receives gas and liquid and advances it beyond the gas dispersing unit, Fig. 4 is a perspective view of the inlet valve for this pump, and Fig. 5 is a horizontal section through the dispersing unit.

The main elements or units of the apparatus as illustrated somewhat diagrammatically in Fig. 1, include a pump A for delivering the cold mix under pressure, a second pump B for receiving the mix and a gas being taken for instance from the atmosphere or any other suitable source through the gas inlet pipes C and the gas and mix being delivered together under pressure to a dispersing unit D. Here the gas is thoroughly dispersed throughout the mix either in solution or in fine sub-division and suspension, depending upon the pressure employed and the relative quantities of the mix and gas. An additional pump E may be employed if desired for delivering fruits, nuts or other relatively solid particles of materials to the gas charged mix which flows from the dispersing unit B to the freezing unit F. Thence the partially frozen mix flows past a back pressure valve G and through a three-way valve H, through either of a pair of telescopic filling tubes J into a suitable receptacle K.

Upon starting the apparatus in operation it is desirable to maintain a back pressure on the material passing through the freezing unit and this back pressure may be continued if desired during normal operation. Merely as one means for maintaining such back pressure I have illustrated the valve mechanism of Fig. 2 which includes a piston or plunger 170 pressed toward closing position by a spring 171 the pressure of which may be varied by an adjusting screw 172. A stop 173 may be provided to limit the extent to which the plunger may be moved by the spring. This spring pressure may be readily adjusted so as to give any desired back pressure on the material. The adjusting screw is preferably mounted in a casing 174 which may have an outlet port 175 to permit flow of air into or out of the casing during movement of the plunger 170.

The material delivered past the back pressure valve may be conducted by pipe 176 to any suitable receiving mechanism such as the filling tubes J. These tubes extend into the cans or receptacles K so that the material is delivered to the bottom of each receptacle and the discharge end of the tube rises as the receptacle fills. This construction is not specifically claimed herein but is specifically disclosed and claimed in the Vogt and Wymond Patent No. 1,881,106.

The two pumps A and B, one for the mix and the other for the gas and mix, may be mounted on the same base and driven from the same source of power if desired, but with suitable means for varying and controlling their actual and relative speeds in accordance with the speed of the source of power, the effectiveness of the temperature changing medium employed in the freezing unit, the desired hardness of the delivered product, the percentage of overrun desired, the nature and type of material being treated, and other factors.

The pump A is shown mounted upon the side of a casing 30 for the motor and gearing, and the pump B is shown mounted on top of this casing. The pump A is preferably of the positive acting rotary type, involving the use of intermeshing gears, the pump illustrated being of a type commonly known in the trade as a Viking pump. As the details thereof form no portion of the present invention, they are not illustrated.

The pump B is of the multiple plunger reciprocating type and is disclosed in complete detail in my copending application Serial No. 459, filed Jan. 5, 1935, which is a division of the above identified application Serial No. 602,157. Only so much of the pump B has been illustrated herein as is necessary to a general understanding of the manner in which this pump takes in mix and gas and positively advances the gas and mix under pressure to the dispersing unit B.

Pumps A and B are driven from a common source of power, such for instance as an electric motor 31 and through suitable speed varying mechanism, such as a Reeves drive (not shown), the relative speeds of the pumps may be varied. Mechanism controlled from hand wheel 32 and more fully described in my copending application Serial No. 459 permits variation of the actual speeds of the pumps.

The cold mix is delivered to the pump A through a pipe 33 from mixing tanks, a homogenizer, or other suitable equipment (not shown) commonly used in the manufacture of ice cream or other material to be processed. The mix is delivered by the pump A through pipe 34 to the inlet of the pump B. This mix is not delivered under pressure if the overrun is to be high, but may be delivered under low pressure for low overrun. The pipe 34 may have an extension 35 communicating with a chamber 36 to compensate for the continuous delivery from the pump A and the intermittent admission of the mix to the cylinders of the pump B. The pressure gauge at 37 affords a visual indication of the pressure at which the mix is being delivered.

The pump B is preferably of the multiple plunger reciprocating type serving to pump both gas and mix and deliver them under pressure. As illustrated more particularly in Figs. 2 and 3, any suitable number (typically three) pump cylinders 38 may be cast in the same block, this block being integral with a casing 39 for the inlet valve 41 and with a casing (not shown) for the outlet valves. Plungers 40 working in the cylinders are so driven that at least one plunger is always traveling on its discharging stroke and another plunger always traveling on its intake stroke.

A rotary cylindrical inlet valve 41 disposed in the valve casing 39 and driven in any suitable manner is provided with a central bore 42 communicating as through a T fitting 43 with the pipe 34. Radial ports 44 in the valve 41 connect with the central bore 42 and intermittently and successively communicate with corresponding inlet ports 46 leading into the separate cylinders of the pump.

The valve 41 also serves to control the admission of gas to each cylinder of the pump B in advance of the entrance of the mix thereto. In the manufacture of ice cream it is the usual practice to use air as the gas for giving the desired overrun, but it will be evident that any other inert gas, such for instance as carbon dioxide, nitrogen, helium or the like, may be used.

The valve casing is provided with two or more ports 47 in the side thereof which may open directly to the atmosphere or may be connected by pipes C to any other source of gas. The valve 41 is provided with a pair of annular grooves 48 in registry with the ports so that the gas may enter these grooves and flow circumferentially of the valve. These grooves communicate with longitudinally extending grooves or channels 49 in the periphery of the valve and each of these last mentioned grooves terminates in an elongated port 50 extending along a portion of the periphery of the valve and in the same transverse plane as the radial ports 44 from the central bore 42.

Each port 50 is disposed a short distance in advance of the corresponding port 44 in the direction of rotation of the valve so that the gas and mix may be delivered separately and in succession to each cylinder, the construction of the valve 41 being such that on the intake stroke of each piston, first gas and then mix is delivered thereto and during the expelling stroke of each piston the cylinder intake port 46 is sealed by the valve.

It will be evident that by proportioning the width of the ports 50, 44, the relative proportions of gas and mix entering the cylinder may be varied at will. In order to produce an ice cream having 100% overrun, which is average, the gas and mix may be admitted in approximately equal quantities. This may require a slightly larger volume of gas to provide for the amount of gas which remains dissolved in the mix after the pressure is released, as will hereinafter be more fully explained. The gas being sucked in may enter at slightly below atmospheric pressure, whereas the mix is forced in and may act to very considerably compress the air in the cylinder even before the piston reaches the end of its intake or suction stroke. Alternatively the gas may be delivered to the inlet under pressure and if so, the positions and/or size of the ports 50, 44 may be correspondingly varied.

The several cylinders discharge continuously through a common discharge passage (not shown) from whence the gas and mix pass under pressure through pipe 51 into the dispersing unit D. This unit may conveniently include a casing 58 having an inlet 52 at the bottom connected to the pipe 51 and an outlet 53 at the top connected to a delivery pipe 54. A shaft 55 projecting through the top of the casing carries mixers, agitators or other dispersing devices of any suitable character to thoroughly agitate or whip the mix and gas within the chamber. One suitable mechanism illustrated in Fig. 5 includes a rotor 56 carried by shaft 55 and having spaced passage-forming blades curved reversely to the direction of curvature of the blades of a stationary annular baffle member 56a encircling the rotor. The shaft is driven at high speed in any suitable manner as for instance by a motor 57 supported on the top of the casing. The mix with the gas thoroughly dispersed and/or dissolved therein may be delivered directly through pipe 54 to the freezing unit F or may be by-passed through the pumping mechanism E for forcing fruit or nuts into the mix before it reaches the freezing unit.

The freezing unit which has been diagrammatically illustrated corresponds generally to units of the character disclosed in my prior Patents Nos. 1,783,864, 1,783,865, 1,783,866, and 1,783,867. It consists of a cylindrical chamber 60 enclosed in a jacket 61 through which refrigerant flows, the refrigerant inlet being indicated at 62 and the refrigerant outlet at 63. Journalled for rotation centrally of the chamber 60 is a mutator shaft 64 coacting with the chamber wall to provide a relatively restricted annular space through which the material to be frozen flows. Scraper blades 65 carried by the mutator shaft 64 prevent the frozen material from adhering to the walls of the chamber. The material entering the chamber through pipe 54 is partially frozen therein and passes from the outlet end of the chamber still under pressure, through a pipe 66 which conducts it to the back pressure valve 170 and after passing this valve, the partially frozen mix is delivered as above described, to the containers K.

Any suitable means may be used for driving the mutator shaft such for instance as the motor 67 and if desired the various motors 67, 57, 31 and also the motor for pumping in fruits and nuts, may be synchronously driven or may be mechanically synchronized in any suitable fashion.

It is of importance that the entire system is maintained under pressure. The back pressure valve at G insures relatively high pressures in the dispersing unit B in order to procure more rapid and thorough dissolving of the gas in the mix.

It is also to be understood that instead of the type of freezer diagrammatically illustrated herein a mechanism such as that employed in my copending application Serial No. 602,157 may be employed in which event the aerated mix is frozen substantially without agitation.

An important feature of the invention is the thorough incorporation of the gas in the mix before any refrigeration occurs since ice cream having exactly the desired overrun may thus be produced and any difficulties incidental to incorporating gas in the freezer are eliminated. Furthermore, by setting the control speed of the pumps A and B and the tension of the back pressure valve G, partially frozen ice cream may be delivered at an absolutely uniform rate and frozen to any required state.

Having thus described my invention, what I claim as new and desire to secure by Letters Patent is:

1. A method of processing material, including the steps of putting the material and a gas under pressure, thereafter dispersing said gas in said material while under a pressure substantially above that of the atmosphere and at a temperature not substantially below that of the atmosphere, to effect at least partial dissolving of the gas, then conducting the material while under pressure to a freezing chamber, and there subjecting the material subsequently and while still under pressure to the action of a temperature changing medium to change the state thereof, whereby the gas is retained after release of the pressure.

2. The method of making ice cream or the like, which includes the steps of delivering the mix and a gas under pressure substantially above that of the atmosphere, dispersing the gas throughout the mix while under pressure and while subjected to a temperature above that at which any of the ingredients of said mix freeze to effect at least a partial solution of the gas into the mix, conducting the mix with the dispersed and dissolved gas while under pressure into a freezing chamber, and there partially freezing the liquid under pressure to thereby retain the gas after release of the pressure.

3. A method of making ice cream, which includes delivering the mix and a gas under pressure substantially above that of the atmosphere, continuously advancing the mix and the gas under pressure, dispersing the gas in the mix while under pressure, and at a temperature above that at which any of the liquid constituents of the mix freeze and substantially without varying the temperature of the material to effect solution of a substantial portion of the gas in the liquid, and then further advancing the mix and freezing it while still under pressure.

4. A method of making ice cream, which includes advancing a liquid mix and gas under pressure and then while said material is being continuously advanced and maintained under pressure, first dispersing the gas through the liquid so that a substantial portion of the gas is dissolved therein without subjecting the material to refrigeration and subsequently freezing the mix and continuously delivering the frozen mix.

5. A method of making ice cream or the like, which includes the steps of contacting the mix and a gas under pressure substantially above that of the atmosphere, thereafter dispersing the gas thoroughly throughout the mix while at a temperature above the freezing point of any of the ingredients of said mix, to effect directly a partial solution of the gas in the mix, and thereafter partially freezing the mix with the dispersed and dissolved gas to thereby retain the gas after release of the pressure.

6. An apparatus for freezing ice cream, including an agitating chamber, means for continuously delivering the liquid mix and a gas under pressure to said agitating chamber, means in said chamber for agitating said mix and gas under pressure to effect solution of a substantial portion of the gas in the liquid, a freezing chamber, a conduit for continuously delivering said mix and dissolved gas to said freezing chamber, and means for applying a refrigerating agent to said freezing chamber to freeze a portion of the liquid of the mix and thereby retain the gas after release of pressure.

7. An apparatus for processing material, including a dispersing unit, a temperature changing unit, means for delivering a gas and a liquid or semi-liquid into said dispersing unit under pressure, agitating means in said dispersing unit, and means for conducting the material while under pressure into, through and out of said temperature changing unit.

8. An apparatus for processing material, including a pump for delivering a liquid and a gas under pressure, a chamber exposed to the temperature of the atmosphere receiving said material and having means for effecting thorough intermixing and at least partial solution of the gas in the liquid, a temperature changing unit connected to said chamber for receiving material under pressure therefrom, means connected to the outlet of said unit for permitting release of pressure, and means for effecting a change in temperature and plasticity during movement through said unit, whereby said gas is retained in the material upon the release in pressure.

9. An apparatus for processing material, including a pump having separate inlets for a liquid and a gas and an outlet for the liquid and gas, a mixing chamber connected to the outlet of said pump, a freezing unit connected to the outlet of said mixing chamber, and means connected to the outlet of said freezing unit for releasing the pressure of said material.

10. An apparatus for processing material, including a chamber exposed to the temperature of the atmosphere, means for forcing a liquid and a gas into said chamber under pressure, means within said chamber for thoroughly dispersing said gas through said liquid and effecting at least partial solution of said gas, a freezing unit having an inlet connected to said mixing chamber, and having a passage therethrough for the continuous movement of the mixed liquid and gas, and means for applying a refrigerant to the material during its movement through said freezing unit.

11. In an apparatus for freezing ice cream or the like, a freezer, a mixing chamber separate therefrom, a pump for supplying both mix and gas to said mixing chamber under pressure and continuously forcing the same through said chamber and said freezer, and separate means in said freezer and said mixing chamber for agitating the material therein.

12. In an apparatus for freezing ice cream or the like, a freezer, a separate mixing chamber, a pump for supplying both mix and gas to said mixing chamber under pressure and continuously forcing the same through said chamber and said freezer, and a separate pump for delivering the mix to said first mentioned pump.

13. In an apparatus for freezing ice cream or the like, a freezer, a separate mixing chamber, a pump for supplying both mix and gas to said mixing chamber under pressure and continuously forcing the same through said chamber and said freezer, a separate pump for delivering the mix to said first mentioned pump, and means for varying the relative speeds of said pumps.

14. In an apparatus for freezing ice cream or the like, a freezer, a separate mixing chamber, and a multicylinder pump for supplying both mix and gas to said mixing chamber under pressure and continuously forcing the same through said chamber and said freezer, said pump having a single discharge conduit leading to said mixing chamber, a feed pump for delivering the liquid to said multicylinder pump, and valve mechanism for admitting gas to each cylinder of said multicylinder pump in advance of the admission of liquid thereto from said feed pump.

CLARENCE W. VOGT.